US008898474B2

(12) United States Patent
Shen et al.

(10) Patent No.: US 8,898,474 B2
(45) Date of Patent: Nov. 25, 2014

(54) SUPPORT OF MULTIPLE PRE-SHARED KEYS IN ACCESS POINT

(75) Inventors: Hui Shen, Sammamish, WA (US); Xiong Jiang, Lynnwood, WA (US); Anirban Banerjee, Issaquah, WA (US); Hong Liu, Sammamish, WA (US); Taroon Mandhana, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1431 days.

(21) Appl. No.: 12/359,987

(22) Filed: Jan. 26, 2009

(65) Prior Publication Data

US 2010/0115278 A1 May 6, 2010

Related U.S. Application Data

(60) Provisional application No. 61/111,240, filed on Nov. 4, 2008.

(51) Int. Cl.
*H04L 9/30* (2006.01)
*H04L 29/06* (2006.01)
*H04L 9/08* (2006.01)
*H04W 12/04* (2009.01)
*H04W 88/08* (2009.01)

(52) U.S. Cl.
CPC ........... *H04L 9/0844* (2013.01); *H04L 2209/80* (2013.01); *H04L 63/061* (2013.01); *H04W 88/08* (2013.01); *H04W 12/04* (2013.01)
USPC ........................................................ 713/176

(58) Field of Classification Search
USPC ................................................ 713/171, 176
See application file for complete search history.

(56) References Cited

U.S. PATENT DOCUMENTS 7,454,785 B2 11/2008 Kerstens
2004/0078566 A1 4/2004 Barber
(Continued)

FOREIGN PATENT DOCUMENTS

WO 2005089949 A1 1/2005
(Continued)

OTHER PUBLICATIONS

International Search Report and Written Opinion for International Application No. PCT/US2009/063044 mailed May 7, 2010.
Iyer, P. et al., "Scalable Deployment of IPsec in Corporate Intranets," 2000, http://www.dell.com/downloads/global/solutions/ipsec_dep_ial_122.pdf.
(Continued)

*Primary Examiner* — Matthew Smithers
(74) *Attorney, Agent, or Firm* — John Jardine; Kate Drakos; Micky Minhas

(57) ABSTRACT

A method of operating an access point (AP) configured to support multiple pre-shared keys at a given time to authenticate its associated client devices. Each client device associated with the AP is provisioned with a key. To authenticate the client device that attempts to connect to the AP, the AP determines which pre-shared key (PSK) of the multiple supported pre-shared keys (PSKs), if any, matches information including the key received from the client device. When the information matches, the client device is allowed to connect to the AP. Provisioning the AP with multiple PSKs allows selectively disconnecting associated client devices from the AP. The AP may be configured to support PSKs of different lifetime and complexity. Removing a PSK of the multiple PSKs supported by the AP and disconnecting a client device that uses this PSK does not disconnect other client devices using different keys to access the AP.

20 Claims, 7 Drawing Sheets

(56) References Cited

U.S. PATENT DOCUMENTS

| | | | |
|---|---|---|---|
| 2004/0240412 A1 | 12/2004 | Winget | |
| 2006/0083377 A1 | 4/2006 | Ptasinski | |
| 2007/0043945 A1 | 2/2007 | Choi | |
| 2007/0053508 A1* | 3/2007 | Yasumoto | 380/28 |
| 2007/0121565 A1 | 5/2007 | Halasz et al. | |
| 2007/0223701 A1 | 9/2007 | Emeott | |
| 2007/0264973 A1 | 11/2007 | Dowek et al. | |
| 2007/0280481 A1* | 12/2007 | Eastlake et al. | 380/277 |
| 2008/0031155 A1* | 2/2008 | Korus et al. | 370/254 |
| 2008/0123852 A1* | 5/2008 | Jiang | 380/273 |
| 2008/0220741 A1* | 9/2008 | Hung | 455/411 |
| 2008/0250478 A1* | 10/2008 | Miller et al. | 726/5 |
| 2009/0028335 A1* | 1/2009 | van de Groenendaal | 380/274 |

FOREIGN PATENT DOCUMENTS

| | | | |
|---|---|---|---|
| WO | WO 2005/000894 A1 | 1/2005 | |
| WO | 2006129287 A1 | 12/2006 | |
| WO | WO 2006/012928 A1 | 12/2006 | |

OTHER PUBLICATIONS

Kagan, A., "How Things Work: WLAN Technologies and Security Mechanisms," Nov. 7, 2003, https://www2.sans.org/reading_room/whitepapers/wireless/1301.php.

Int. Preliminary Report cited in PCT Application No. PCT/US2009/063044 dated May 10, 2010, 8 pgs.

First Chinese Office Action cited in Chinese Application No. 200980144623.3 dated Apr. 22, 2013, 15 pgs.

Reply first Chinese Office Action cited in Chinese Application No. 200980144623.3 dated Jul. 29, 2013, 12 pgs.

Second Chinese Office Action cited in Chinese Application No. 200980144623.3 dated Sep. 23, 2013, 15 pgs.

Rely second Chinese Office Action cited in Chinese Application No. 200980144623.3 dated Nov. 26, 2013, 14 pgs.

Third Chinese Office Action cited in Chinese Application No. 200980144623.3 dated Dec. 13, 2013, 10 pgs.

Reply third Chinese Office Action cited in Chinese Application No. 200980144623.3 dated Feb. 11, 2014, 7 pgs.

Chinese Notice of Allowance cited in Chinese Application No. 200980144623.3 dated Apr. 17, 2014, 6 pgs.

* cited by examiner

SUPPORT OF MULTIPLE PRE-SHARED KEYS IN ACCESS POINT

CROSS REFERENCE TO RELATED APPLICATION

This application claims the benefit under 35 U.S.C. §119(e) of U.S. Provisional Application Ser. No. 61/111,240 entitled "SUPPORT OF MULTIPLE PRE-SHARED KEYS IN ACCESS POINT," filed Nov. 4, 2008, which is hereby incorporated by reference in its entirety.

BACKGROUND

Today, a variety of computer devices are capable of communicating wirelessly. For example, mobile computing devices such as personal computers, personal digital assistants, cellular phones, printers, scanners and others may communicate over a wireless local area network (WLAN) using the IEEE 802.11 standard for wireless networking. To access wireless network, the computer devices, or other client devices, may wirelessly "associate" with a device configured as an access point (AP), which then provides the client devices with access to system or network resources. An AP can be implemented as a dedicated device configured specifically to provide network access or may be implemented by programming a computer that performs other functions. When implemented by programming a computer, the access point may be called a "soft AP." The resources to which a soft AP provides access may, like a "hard AP," include other devices connected to a network, and in some instances may include applications or other elements within the computer acting as the soft AP.

To enable secure communication, the client devices and the AP mutually authenticate each other by exchanging secret information. If the exchange is successful, the AP allows the client device to connect to the network. The secret information may be pre-shared keys. If pre-shared keys are used, the AP and associated wireless client devices are provisioned with an identical pre-shared key used for the authentication.

For example, according to the WPA and WPA2 authentication and key exchange protocols, when attempting to access a network, a client device provides information generated with its pre-shared key to the AP. If the AP can verify that information using its copy of the pre-shared key, the client is authenticated. The pre-shared key may be used to derive temporary session keys, for data encryption and decryption, and for other purposes.

Conventionally, if pre-shared keys are used, an AP uses a single pre-shared key for associating with client devices. Thus, all client devices associated with the same AP share the same pre-shared key.

SUMMARY

The inventors have recognized and appreciated that the role of wireless networking is likely to change and that operation that better matches user expectations can be provided by access points that support multiple pre-shared keys and that can automatically identify an appropriate pre-shared key for each device seeking network or system access.

In an access point that receives connection requests from multiple different types of devices, the client devices may have different requirements with respect to a pre-shared key (PSK) and different user tolerance for provisioning the devices with complex keys. Thus, the multiple pre-shared keys in an access point may have different lifetimes and complexity. As a specific example, printers and other stationary client devices may maintain long-term connections with the AP. Because these devices may be provisioned only infrequently with a pre-shared key, a complex key can be used to maintain security without significant user burden. In contrast, a Personal Digital Assistant and other mobile devices may only need a short-term connection to the AP, which may be initiated using a key typed into the mobile device by a user. For such connections, a less complex key may be used because there is less risk of compromising network security if the key is used for a short connection. User burden in provisioning a device is reduced by using a less complex key.

To support keys of different duration, an access point according to some embodiments of the invention may be configured to remove some PSKs without disconnecting other client devices that may by using other PSK's. In this way, short-term PSK's can be removed without disrupting devices that have long-term connections with the AP.

To facilitate communication between an AP and associated client devices, embodiments of the invention provide configuring the AP to support multiple pre-shared keys (PSK's). Each client device associated with the AP may be provisioned with one of the multiple PSK's. Thus, while more than one of the client devices may still share a PSK, the AP supports more than one PSK at a given time to authenticate its associated client devices, according to some embodiments of the invention. When a client device attempts to access a network via the AP, the AP determines which PSK of the multiple supported PSK's to use to authenticate the client device. The AP and the client devices may utilize these PSK's for communication over a WLAN, for example, a Wi-Fi® technology using the IEEE 802.11 standard.

In some embodiments of the invention, client devices associated with an AP may be grouped, with the devices belonging to the same group sharing a PSK. The removal of a PSK used by client devices forming one group terminates access to a network by the devices in this group without affecting network access by client devices in other groups using different PSK's.

Provisioning the AP with multiple PSK's allows the AP to be configured to support PSK's of different types. For example, PSK's of different lifetime and complexity may be employed by the AP at a given time. Some PSK's may be short and suitable for input by a human user. Some PSK's may change frequently and can support transient network access. Others may be long to provide better security for long-term connections.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various Figures is represented by a like numeral. For purposes of clarity, not every component may be labeled in every drawing. In the drawings.

DETAILED DESCRIPTION

Figure 1:
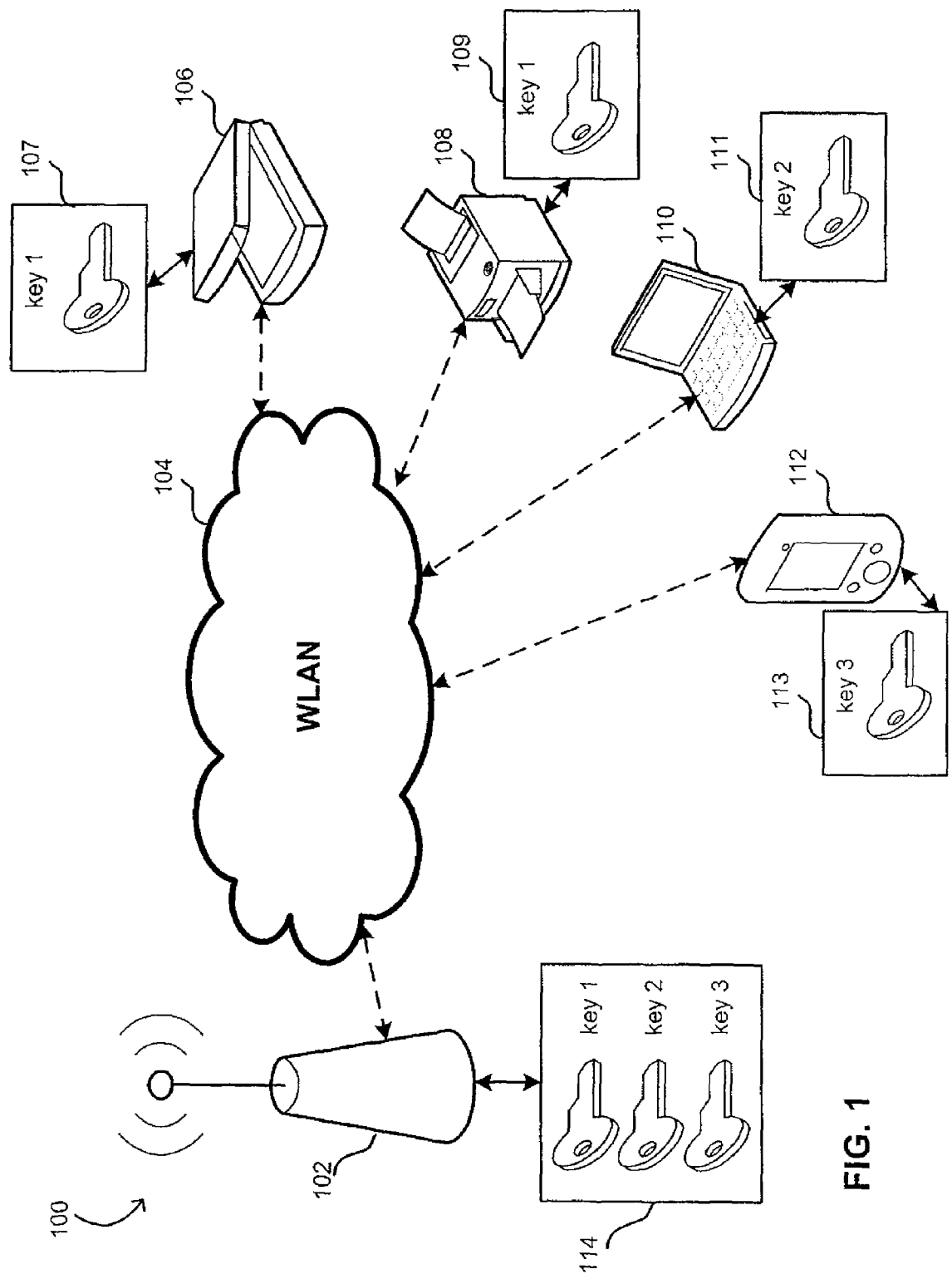
FIG. 1 is a sketch of a computing environment in which some embodiments of the invention may be implemented.

In wireless communication, a device configured as an access point (AP) and a client device may mutually authenticate each other using certain secret information. The information may include pre-shared keys (PSK's).

The inventors have recognized and appreciated that client devices may have different requirements from a PSK and different user tolerance for provisioning the devices with complex keys. Thus, user experience may be improved by enabling a user of a client device to utilize PSK's of different types for AP access. For example, different keys may have a lifetime and complexity appropriate for a given connection to the AP. For example, the PSK may be a short-term key that is used temporarily and has a user-friendly format that allows easily typing in the key by a user of the client device. The short term key may be used, for example, by a laptop or a PDA user that is allowed to access the Internet via the AP for a short period of time. User burden in provisioning the client for AP access is reduced by using a less complex key and security concerns are low because the key may expire after a short time. As another example, a PSK may also be a long term key that is more complex and has a longer lifetime. For example, a stationary printer or scanner may maintain a long term communication with the AP and may thus utilize the long term key that may be more difficult for a user to input.

The inventors have further recognized and appreciated that operation of an AP and communication between the AP and associated client devices may be facilitated by configuring the AP to support multiple pre-shared keys (PSK). Provisioning the AP with multiple PSK's allows selectively disconnecting associated client devices from the AP. Thus, removing a PSK of the multiple PSK's supported by the AP and disconnecting client devices that have used the PSK to authenticate with the AP does not disconnect the rest of the client devices using different PSK's to access the AP.

Further, when two or more client devices form a group where the device share a PSK, the removal of the PSK terminates access to a network by the devices in this group without affecting network access by client devices in other group(s) using different PSK's.

To support keys of different lifetime, an AP according to some embodiments of the invention may be configured to remove some PSK's without disconnecting other client devices that may have long-term connections with the AP. Thus, when a lifetime of a PSK is expired, the PSK is selectively removed from the AP.

Some embodiments of the invention provide a method of operating a device configured as an AP where the AP is provisioned with multiple PSK's. When a client device attempts to connect to the AP, the AP receives a request for a connection from the client device. The request may comprise information that is encrypted, signed or otherwise processed based on the key stored on the client device. The AP may determine whether the client device had access to a valid pre-stored key in order to generate the information and, if so, which PSK of the multiple supported PSK's was used. To make this determination, the AP may compare the information received as part of the request for the connection from the client device with similar information generated based on PSK's from the multiple PSK's provisioned to the AP.

The AP may be provisioned with a plurality of PSK's using any suitable method. For example, to store each PSK, the AP may receive a call via a programming interface which may be called by an application program or by a user interface in response to user input or in any other suitable way.

According to some embodiments of the invention, the AP removes a selected PSK from the multiple PSK's stored on the AP. The AP may remove a PSK as a result of a call to an API, user input through a user interface, an expiration of a lifetime of the PSK and other events. In removing the PSK, the AP may determine whether any client devices connected to the AP used the selected PSK to form a connection. When such devices are found, the AP may disconnect them without disconnecting client devices that use different PSK's to authenticate with the AP. The AP may support one or more API's through which the AP may request to remove a key. Such a request may be generated by an application program, though a user interface in response to user input or in any other suitable way.

Further, removal of a PSK may be triggered by a control element within the AP itself. For example, a selected PSK may be removed from the multiple PSK's stored on the AP when a lifetime of the PSK expires. If any client devices connected to the AP use the selected PSK, the AP may disconnect them without disconnecting client devices that use different PSK's to authenticate with the AP.

FIG. 1 illustrates a networked computing environment 100 in which multiple computing devices communicate with a device 102 configured as an access point using a wireless network 104. Network 104 may be, for example, a wireless local area network (WLAN). Device 102 may be, for example, a computer configured as "soft AP." Though, the AP may be a hardware AP or other wireless device configured to execute a protocol that allows client devices to access resources in ac accordance with a wireless protocol. For example, the AP may operate using Wi-Fi® technology supported by the IEEE 802.11 standards may be utilized.

In the example illustrated, four client devices communicate wirelessly with access point 102 as shown: a scanner 106, a printer 108, a laptop 110 and a PDA 112. The devices may be mobile, stationary or implement both mobile and stationary operational modes. Though four computing devices are illustrated, any number or type of computing devices may communicate with the access point according to embodiments of the invention and four devices are illustrated for simplicity.

Here, AP 102 is configured to support multiple PSK's. Client devices 106, 108, 110 and 112 associated with AP 102 each store a PSK. Thus, in this example, each of the devices 106, 108, 110 and 112 includes a respective PSK, schematically shown in blocks 107, 109, 111 and 113, respectively. For example, scanner 106 and printer 108 both include key 1, laptop 110 includes key 2 and PDA 112 includes key 3. Thus, while scanner 106 and printer 108 share a PSK referred to as key 1, laptop 110 and PDA 112 include different PSK's, which illustrates that AP 102 supports more than one PSK at a given time to authenticate its associated client devices.

Client devices associated with an AP may be grouped, with the devices belonging to the same group sharing a PSK. FIG. 1 illustrates that scanner 106 and printer 108 have the same PSK. Thus, these devices may form a group. According to some embodiments, removal of a PSK used by client devices forming one group terminates network access by the devices in the group without affecting network access by client devices in other groups using different PSK's.

The client devices associated with an AP may have different requirements with respect to a PSK and different user tolerance for provisioning the client devices with complex keys. Thus, the multiple PSK's in an AP may have different lifetimes and complexity. For example, scanner 106 and printer 108 shown in FIG. 1, may be stationary devices that maintain long-term connections with AP 102. Because these devices may be provisioned only infrequently with a PSK, a complex, or "strong," key can be used to maintain security without user burden. In contrast, mobile devices such as laptop 110 and PDA 112 may only need a short-term connection to the AP 102, which may be initiated by a user typing a key into the mobile device. For such short-term connections, a less complex, user friendly, or "easy," key may be used because there is less risk of compromising network security if the short term key may be removed before an unauthorized party can discern the key or use it for unauthorized purposes. Yet, user burden in provisioning a device is thus reduced by using a less complex key which may be beneficial to a user of a mobile device that may need to remember and manually enter the PSK each time the mobile device connects to the network.

Thus, each of the keys 1, 2 and 3 may be of different types. The type may reflect duration of a lifetime of a key, a complexity of the key or other characteristics. For example, keys 1, 2 and 3 may each have different "time-to-live" (TTL) characteristics. It should be appreciated, though, that TTL is only one example of an approach to tracking a lifetime of a key, and a lifetimate may be defined in any other suitable way.

According to some embodiments of the invention, when a client device attempts to access a network via the AP, the AP determines which PSK of the multiple supported PSK to use to authenticate the client device. As shown in FIG. 1, AP 102 includes or is otherwise associated with a storage 114 that includes PSK's supported by the AP. In this example, AP 102 is shown to support three PSK shown schematically as keys 1, 2 and 3. However, AP 102 may support any number of PSK's of different types as embodiments of the invention are not limited in this respect. Moreover, though storage 114 is shown to include all of the PSK's stored on client devices 106, 108, 110 and 112, it should be understood that client devices may have PSK's that are not supported by AP 102. Also, AP 102 may include PSK's that are not stored on any of the associated client devices.

Figure 2:
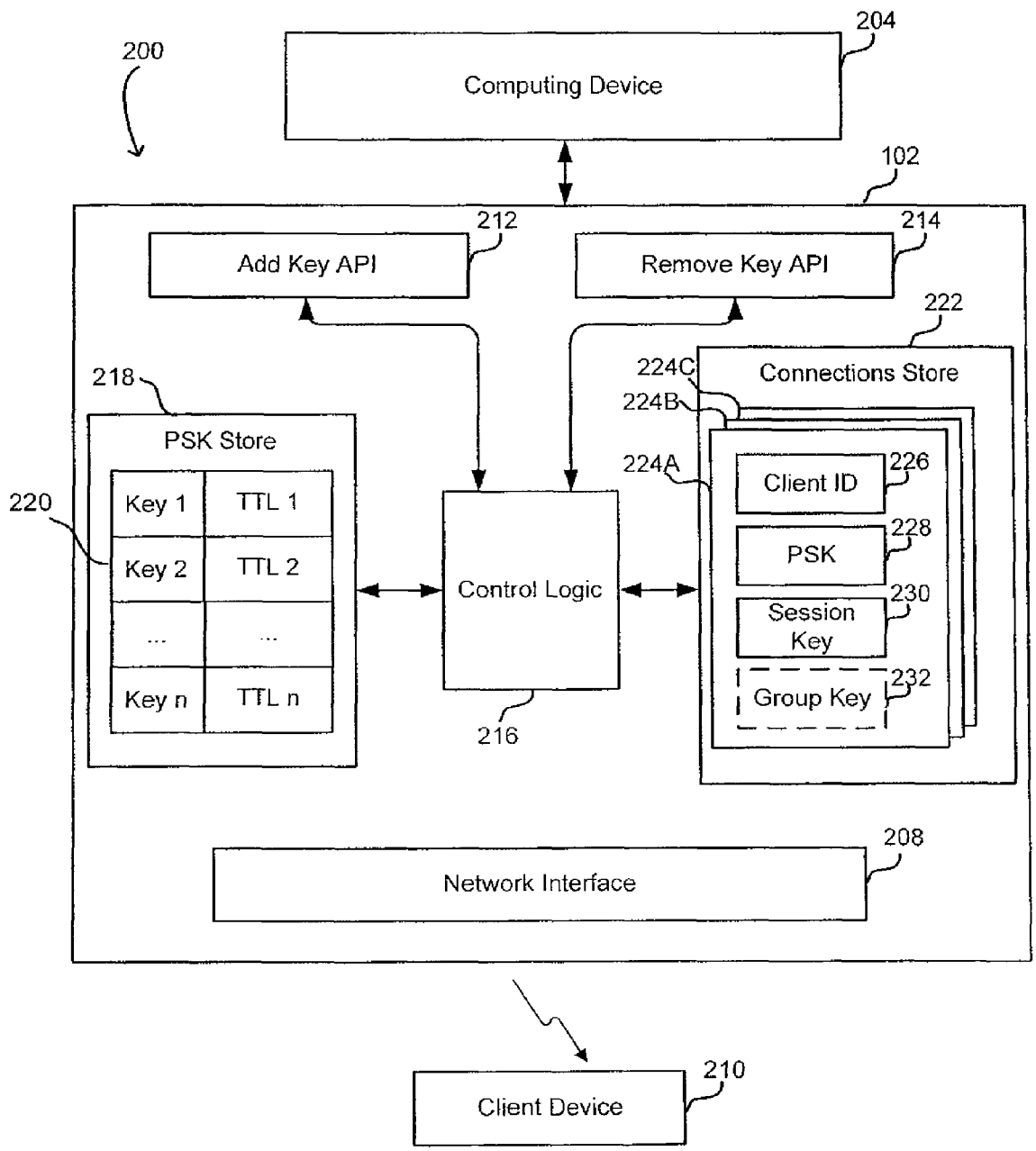
FIG. 2 is a block diagram of components within a device configured as an access point according to some embodiments of the invention.

FIG. 2 illustrates a system 200 including exemplary components within a computer configured as AP 102 according one embodiment of the invention. AP 102 communicates wirelessly with one or more client devices 210 via a network interface 208 which is controlled by other components within AP 102. AP 102 may be configured via a computing device 204 that can be any device such as a desktop, a laptop, a PDA, or any other device that may execute application programs, respond to user input or otherwise perform a control function. It should be appreciated that computing device 204 may include AP 102 which in such case provides a functionality of a soft AP within computing device 204. If AP 102 is a soft AP, some of the components in FIG. 2 may be implemented as computer software in a computer storage media or executed by a processor (not shown). Though, AP 102 may be implemented in any suitable way, including as firmware in a "hard" AP.

In the example illustrated, AP 102 includes interfaces for adding and removing PSK's shown by way of example only as Add Key API 212 and Remove Key API 214. Though two APIs are shown, any number or type of APIs may be used to manage PSK's within AP 102. Addition and removal of PSK's supported by AP 102 as well as other functionality of AP 102, such as determining whether a client device shares a PSK with AP 102, may be provided by Control Logic 216. It should be appreciated Control Logic 216 may include any number of suitable components that control operation of AP 102 according to some embodiments of the invention.

PSK's provisioned to AP 102 are stored in a PSK Store 218 in computer memory of AP 102. In the embodiment illustrated, that memory is non-volatile, though any suitable memory may be used.

The information about PSK's may be organized in any suitable way. Here, PSK Store 218 includes a Key Table 220, which maintains information on PSK's currently stored on AP 102. It should be appreciated that PSK Store 218 may include other suitable component(s). PSK's provisioned to AP 102, for example, via a call through Add Key API 212, are added to PSK Store.

It should be noted that Key Table 220 can have a limit on a number of keys and associated data that it may store. In such embodiments, a PSK may be added to Key Table 220 only if the limit on a number of PSK's that Key Table 220 can store is not reached. Though, it should be appreciated that PSKs may be stored as a list or as a memory structure that can be expanded to accept an arbitrary number of keys such that in some embodiments, there is not a limit as to number of PSKs.

When a PSK is removed from AP 102, for example, upon an instruction received via Remove Key API 214, it is removed from PSK Store 218.

As shown in FIG. 2, each of n keys stored in Key Table 220 has a respective duration shown by way of example only as a time-to-live (TTL). It should be appreciated that duration of a key may be defined in any other suitable way. As discussed above, PSK's can have different durations and may be removed upon expiration of their respective TTLs. Removal of a PSK upon expiration of its TTL may be managed via Remove Key API 214.

Alternatively, removal of a key upon expiration of its TTL may be triggered by Control Logic 216 or any other suitable component. In the illustrated embodiment, processing upon removal of a key is the same, regardless of whether the removal is triggered by a command through API 214, or a trigger issued by Control Logic 216. Though, in some embodiments, different processing may be performed depending on trigger for removing a PSK. It should be appreciated that Key Table 220 may store other information associated with PSK's and a column including TTLs is illustrated for simplicity.

When a client device attempts to access a network via the AP or an application on the AP, suitable components within the AP, such as for example, Control Logic 216, determines which PSK of the multiple supported PSK's to use to form a connection with the client device. For example, in the example illustrated in FIG. 1, AP 102 may determine that a PSK denoted as key 1 stored at API 102 can be used to form a connection with laptop 110 that uses key 1.

When laptop 110 forms a connection with AP 102, the key used to form the connection may be recorded on AP 102. AP 102 further includes a Connections Store 222 that stores data structures shown by way of example as 224A-224C. Each data structure includes data associated with a connection supported by AP 102. For example, a data structure 224A includes data for a connection between AP 102 and a client device such as, for example, any of the devices 106, 108, 110 and 112 shown in FIG. 1. Data structure 224A may include any suitable fields. Thus, data structure 224A includes an identifier of the client device with which the connection is established, here shown as Client ID 226. The data structure also includes a field PSK 228 indicating a key shared between AP 102 and the client device. A PSK can be used to derive other information such as session keys and for data encryption and decryption during key exchange between AP 102 and the client device. This derived information may also be stored. Thus, Connections Store 222 may store Session Key 230 and an optional Group Key 232 for the given connection. It should be appreciated that other information related to the connection may be recorded in data structure 224A and four elements 226-232 are shown for illustration purposes only.

Data structures 224B and 224C include similar information on other connections between AP 102 and associated client devices. For example, data structure 224A may store information on a connection between AP 102 and scanner 106 shown in FIG. 1 while data structures 224B and 224C may include information on connections between AP 102 and laptop 110 and PDA 112, respectively. Though Connections Store 222 is shown to include only three data structures, it should be appreciated that a data structure for each client device connected to AP 102 may be stored in Connections Store 222. When a client device forms a connection, Control Logic 216 may add a data structure to Connections Store 222. When a client device is disconnected from AP 102, a respective data structure may be removed from Connections Store 222.

As discussed above, embodiments of the invention provide a method of operating an AP provisioned with multiple PSK's. When a client device attempts to access a resource, the AP receives a request for a connection to it from the client device. At least a portion of this request is generated using a key provisioned to the client device. The AP then determines whether the request was generated using one of the PSK's. If so, the client device can be connected, authenticated, and a connection may be established based on the PSK identified. If not, the client is not authenticated and a connection is not established. In the embodiment illustrates, the AP determines whether the client device has one of its PSK's by determining whether the request contains information that matches information that can be generated with a key from the PSK's provisioned to the AP. If there is a match, the AP allows the connection. Otherwise, the connection is disallowed.

Figure 3:
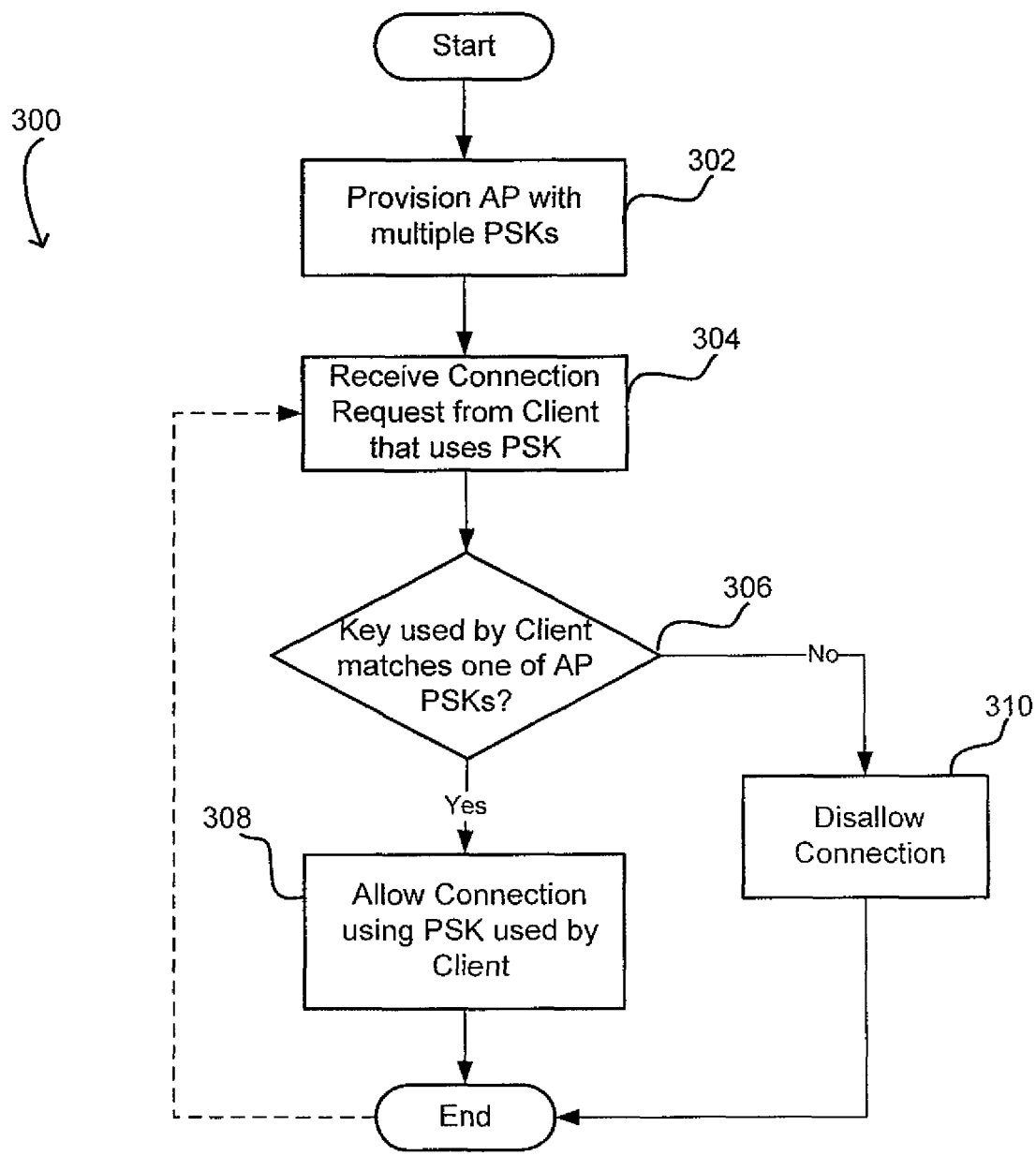
FIG. 3 is a flowchart of a process of operating an access point according to some embodiments of the invention.

FIG. 3 is a flowchart of a process of operating an access point according to some embodiments of the invention. Process 300 starts when a device is configured as an AP (e.g., AP 102) or at any other suitable time. At block 302, the AP may be provisioned with a plurality of PSK's. The AP may be provisioned with the PSK's using any suitable method. For example, to add each key, the AP may receive a call through a programming interface (e.g., Add Key API 212) identifying a key to be stored in the AP. A call though such an API may originate in response to input received via a user interface or in any other suitable way.

In addition to providing a value for each PSK, provisioning a PSK may include specifying duration of the key or other characteristics of the key. Such information may be provided through the same API as the key itself or in any other suitable way. As discussed above, client devices may have different requirements with respect to a PSK. Thus, embodiments of the invention provide use of PSK's of different lifetime and complexity. In one embodiment, a PSK may be a 256 bit number or a passphrase from 8 to 63 bytes long. However, it should be appreciated that embodiments of the invention are not limited in this respect and a PSK of any suitable length and format can be utilized. The PSK's may have different lifetimes and complexity which may be selected based on user tolerance for provisioning the client devices with the keys. Thus, a PSK may be a short-term key which is used temporarily (e.g., has a short TTL) and has a user-friendly format that allows easily entering the key by a user of the client device. The short-term key may be a password comprising a sequence of alphanumeric characters. The short-term key may be used, for example, by a laptop user that is allowed to access the Internet via the AP for a short period of time. A PSK may also be a long-term key that is more complex and has a longer duration of a lifetime (e.g., has a long TTL) and may be provided for client devices maintaining long-term connections with the AP. For example, a stationary printer may maintain a long-term communication with the AP and may thus utilize the long-term key. A long-term key may be more difficult for a user to input.

The provisioned key may be stored for later use of the API, including for use after the AP is rebooted. PSK's provisioned to the AP may be stored, for example, in PSK Store 218 shown in FIG. 2. Each PSK may have its associated TTL and other characteristics stored in PSK Store 218 as well. It should be appreciated that the AP may be provisioned with multiple PSK's at any suitable time. For example, different PSK's may be provisioned to the AP at different times.

In block 304, the AP receives (e.g., via Network Interface 208 shown in FIG. 2) a request for a connection to the AP from a client device. The request may be sent at any time and may be in a format of a known connection or any other suitable format. Also, the requested network access may be for any desired purpose. For example, the client device may request the connection to access, via the AP, a resource on a network. Also, the client device may send a request to access an application on the AP. It should be appreciated that the client device may send the request for the connection to the AP for other purposes as embodiments of the invention are not limited in this respect. A portion of the request may be generated with a key stored on the client device.

In decision block 306, the AP (e.g., Control Logic 216) determines, for each PSK from the plurality PSK's provisioned to the AP, whether the portion of the request generated with the key comprises information that matches information generated with a PSK from the plurality PSK's. The portion of the request generated with the key may be, for example, a signature of a message comprising the request. In the WPA and WPA2 protocols, the signature may be a Message Integrity Code (MIC) computed by the client device and described in more detail below. Though, any information derived from a key may indicate that the client has a PSK. The information may be signed, encrypted, hashed or otherwise processed with the key or with another key or code generated with the key.

When it is determined that the information matches, the process branches to block 308 where the connection between the client device and the AP is allowed. The process may then end. As part of allowing the connection, the AP may respond to the request in the same way that an AP as known in the prior art responds to a request, though the response of the AP may be based on a PSK selected after matching information in the request from the client device and additional processing may include generating session keys, group keys or other information based on the identified PSK. Allowing the connection may also include creating a data structure in Connections Store 222, as discussed above.

When it is determined that the information does not match, the process goes to block 310 where the connection is disallowed and the client device is not permitted to access the resource. The process may then end. It should be understood that process 300 may also return to block 304 when another request for a connection from a client device is received, as shown in FIG. 3.

According to some embodiments of the invention, a PSK can be removed from AP, even if it has been associated with one or more of client devices. The removal may be initiated, for example, upon a request to remove the key made by a user or an application. The request to remove the selected key may be performed by the user via a user interface on the AP or the device that is used to configure the AP.

Further, the PSK may be revoked when its lifetime is expired. When the key is revoked, a connection between the one or more client device using this PSK may be selectively broken down. Other client devices connected to the AP and sharing different PSK's with the AP are not disconnected from the AP.

Figure 4:
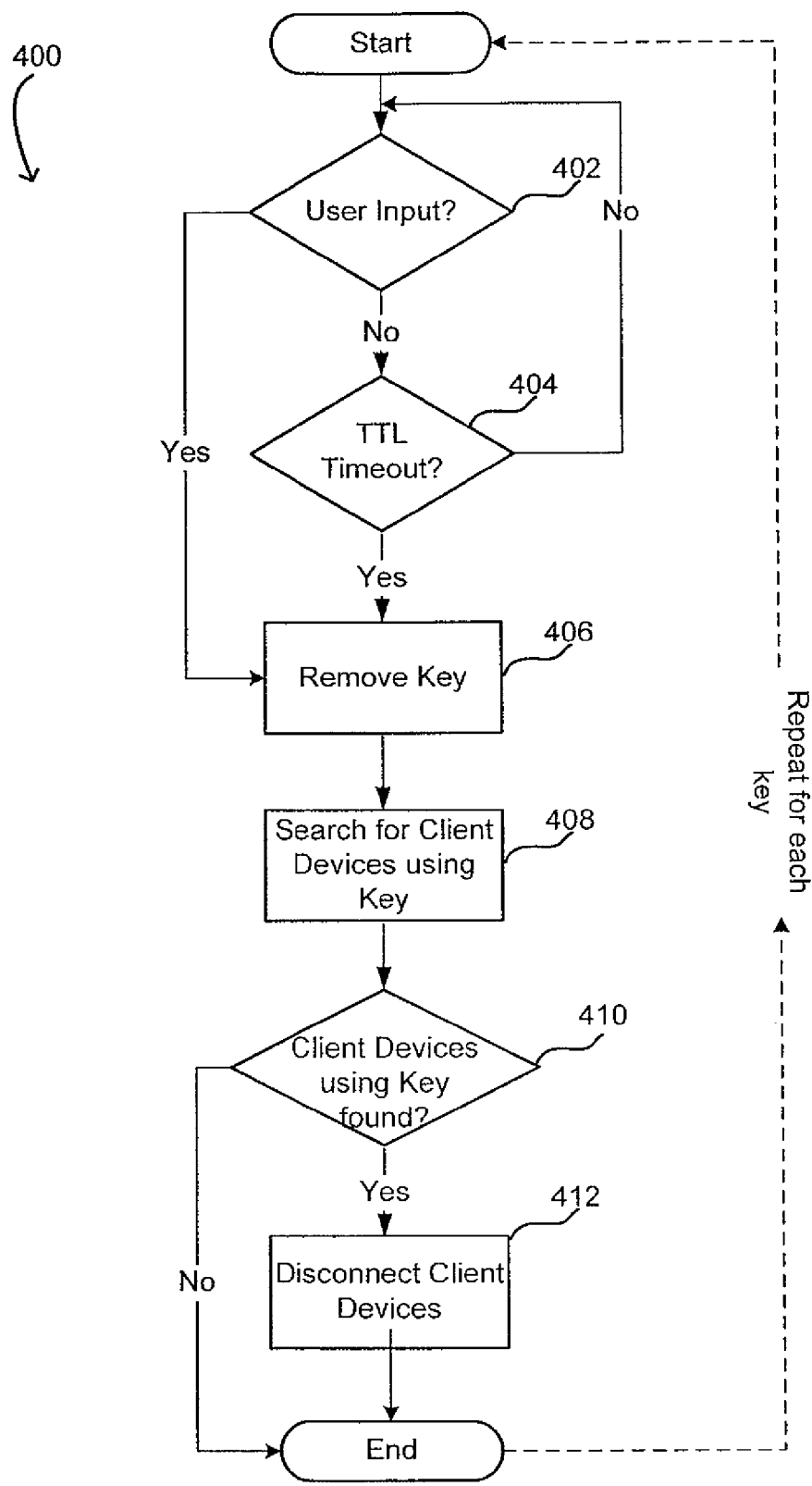
FIG. 4 is a flowchart of a process of removing pre-shared keys provisioned to an access point according to some embodiments of the invention.

FIG. 4 shows a process 400 of removing pre-shared keys provisioned to an access point according to an embodiment of the invention. The process may start at any suitable point and may be part of a continuous monitoring of a state of a programming interface such as, for example, Remove Key API 214 shown in FIG. 2 and/or a timing component within Control Logic 216 that triggers a periodic check of whether any PSK's has exceeded their TTL's. At decision block 402, the process determines whether a user input instructing the AP (e.g., AP 102) to remove a selected PSK is received. The AP or a device (e.g., computing device 204) that configures the AP may have a user interface, which may be used to receive the user input.

When it is determined that the user input instructing the AP to remove the selected PSK has been provided, the process branches to block 406 where the PSK is removed. As discussed above, the selected PSK may be removed from PSK Store 218. In this way, no future connections may be based on the removed PSK.

Conversely, when it is determined at decision block 402 that no user input was provided, the process continues to block 404, where it is determined whether a time-to-live (TTL) associated with the selected PSK is expired. If the TTL is expired, the process goes to block 406 where the selected PSK is removed. When the TTL has not expired, the process returns to the start, as shown in FIG. 4, where the process continues in a loop until input through API 214 is received or a TTL is expired. Though determining whether the user input instructing the AP remove the selected PSK is provided and determining whether a TTL associated with the selected PSK is expired are shown as two consecutive steps, it should be appreciated that these operations may be performed in any order or simultaneously or at any time as the invention is not limited in this respect. Further, it should be appreciated that FIG. 4 shows sequential execution of steps for simplicity of illustration. One or more operations shown in FIG. 4 may be executed is separate computing threads such that some of the illustrated operations may occur simultaneously or at separate times. For example, removing a key when a TTL associated with the PSK is expired may be executed in a separate computing thread from processing calls through an API.

At block 408, the AP searches for client devices use the selected PSK. Regardless of what event triggers the API to remove a PSK, removing a PSK may also include terminating any connection formed within the removed PSK. Accordingly, in the embodiment illustrated in FIG. 2, such devices may be identified by searching in Connections Store 222. Though, any suitable mechanism to associate connections to PSK's may be used.

At decision block 410, it may be determined whether one or more client devices use the selected PSK. When such devices are found, the process continues to block 412 where these client devices are disconnected from the AP because the key that they use has been removed. Further, for each connection being disconnected, a respective data structure associated with the connection such as one of the data structures 224A-224C stored in Connections Store 222 is removed from the Connections Store 222.

According to embodiments of the invention, only client devices that were using the PSK selected to be removed are disconnected upon removal of the PSK. Other client devices that use different PSK for authentication with the AP remain connected to the AP.

When no client devices that use the selected PSK have been found, the process may end. However, the process 400 may be repeated for each key provisioned to the AP, as shown in FIG. 4.

Figure 5A:
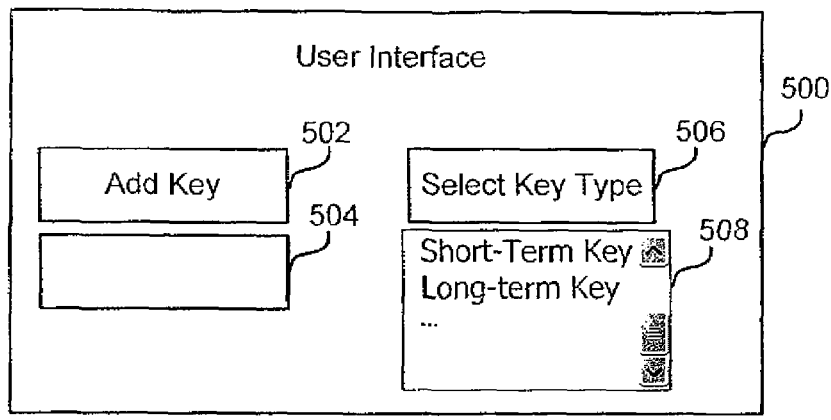
FIGS. 5A-5C are sketches of user interfaces used during a process of provisioning an access point with pre-shared keys according to some embodiments of the invention.
Figure 5B:
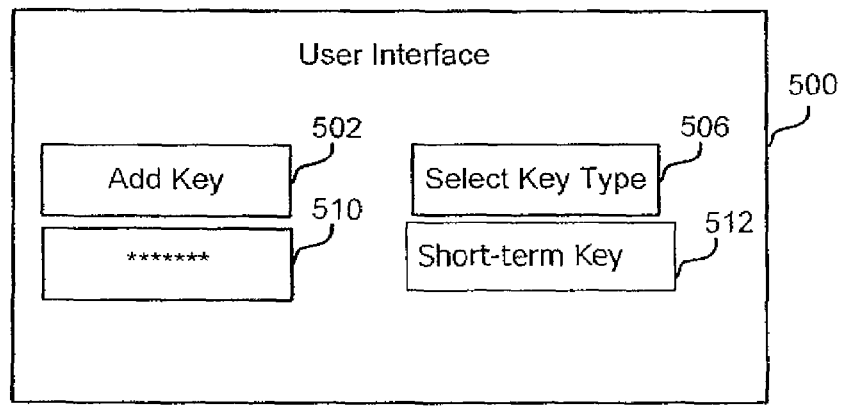
Figure 5C:
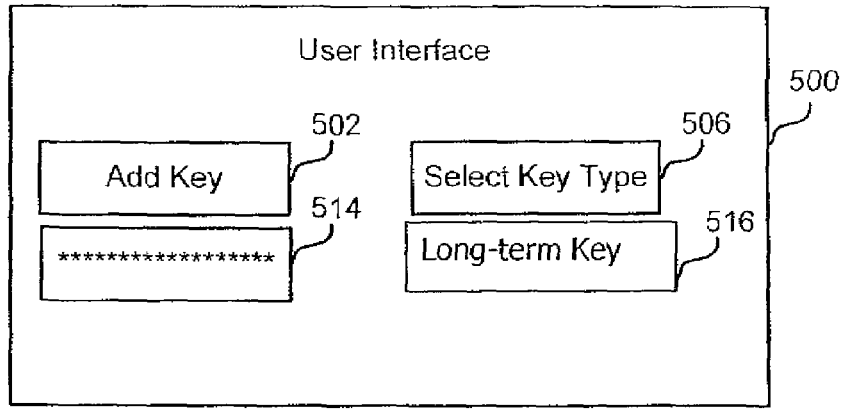

According to some embodiments of the invention, an AP is provisioned with multiple PSK's via a user interface on the AP or a device (e.g., computing device 204) that is used to configure the AP. Though, any suitable provisioning mechanism may be used, FIGS. 5A-5C illustrate an exemplary user interface for provisioning of PSK's according to an embodiment of the invention. FIG. 5A includes a user interface 500 which includes an Add Key element (e.g., a push-down button or other element) and a field 504 where a user may input a value of the key. User interface 500 also includes a Select Key type element 506 (e.g., a push-down button or other element) indicating that the user can select a key of the key. In the embodiment illustrated, two key types are supported, a long-term and a short-term key type. Any number of keys of each type may be allowed. Though in some embodiments, an AP may support only one key of each type. Thus, as shown by way of example in drop-down menu 508, the user may select whether the entered key is a short-term key or a long-term key.

FIG. 5B shows the user interface when the user has selected a short-term key by selecting the "short-term key" option in drop-down menu 508, shown as element 512 in FIG. 5B. Similarly, FIG. 5C shows that the user has selected a long-term key by selecting "the long-term key" option in drop-down menu 508, shown as element 516 in FIG. 5C. In some embodiments, the long-term key may be generated automatically rather than typed in by a user.

Regardless of the type of key selected, the user may also input, through a suitable input device, a value of the key. FIGS. 5B and 5C indicate a value for a short term key entered in field 510 or for a long term key entered in field 514. FIGS. 5B and 5C schematically show that short-term key 510 is shorter that long-term key 516 and may be more easily entered by the user. Though FIGS. 5A-5C show two types of key, it should be appreciated that key of more than two types may be employed as the invention is not limited in this respect. Furthermore, user interface 500 may include any other suitable components and display any other information of any textual and visual format. For example, other components may be included in a user interface to receive input defining characteristics of keys. When the key is entered as shown above, it may be stored in a key table such as Key Table 220 in PSK Store 218 shown in FIG. 2. It should be noted that Key Table 220 may have a limit of a number of entries.

Figure 6:
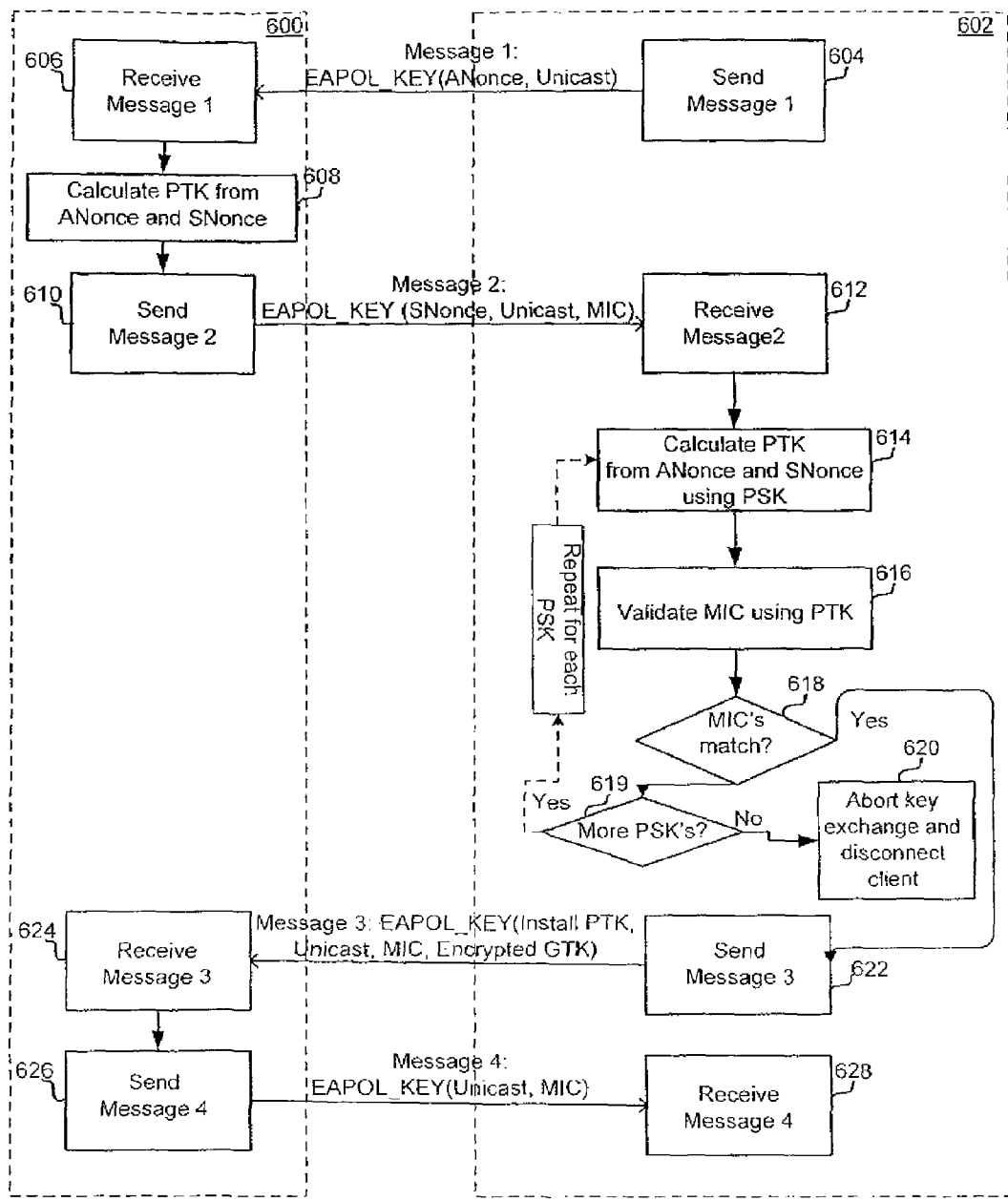
FIG. 6 is a sketch illustrating a key exchange process between an access point and a client device using a Wi-Fi Protected Access 2 (WPA2) protocol according to some embodiments of the invention.
Figure 7:
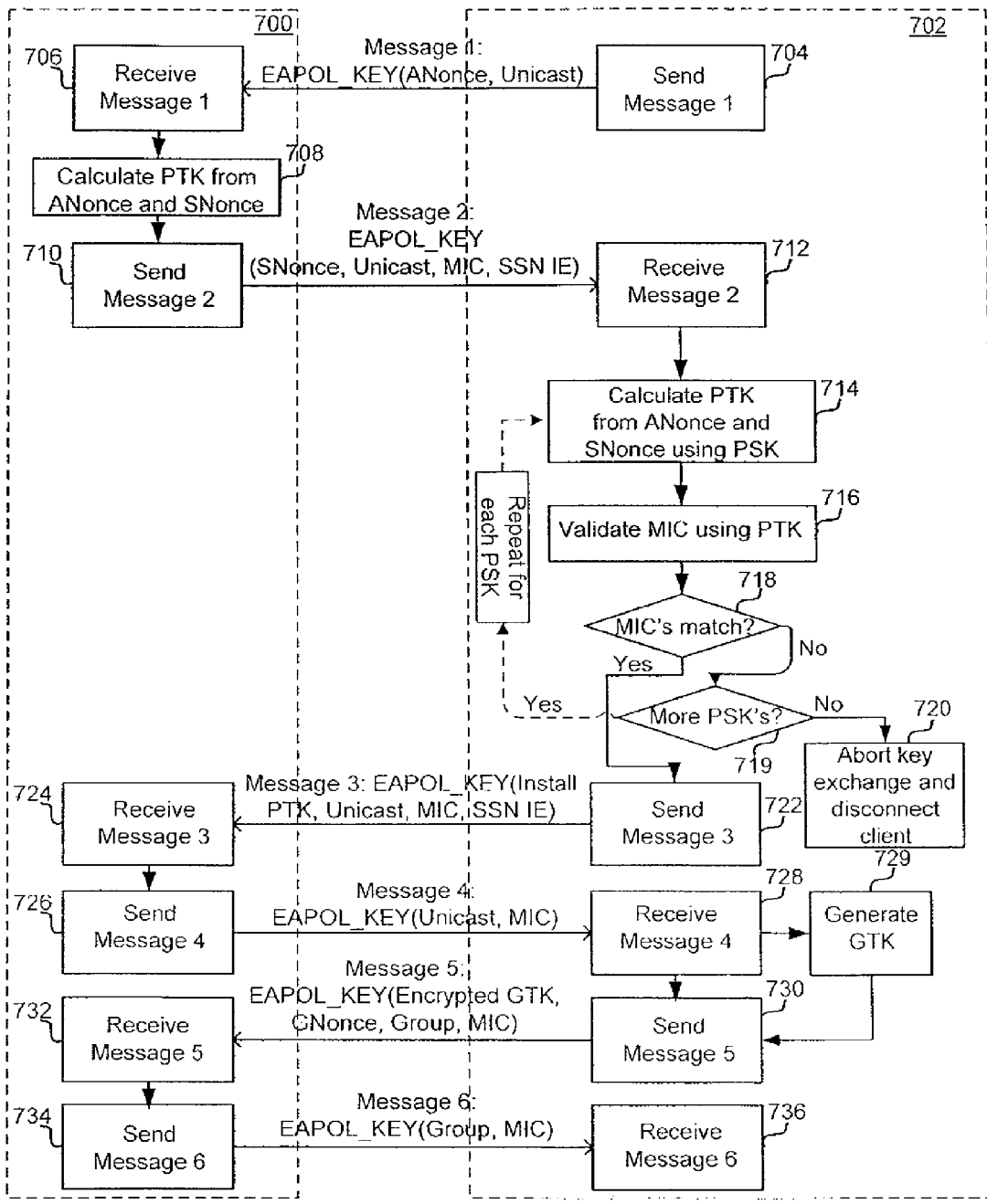
FIG. 7 is a sketch illustrating a key exchange process between an access point and a client device using a Wi-Fi Protected Access (WPA) protocol according to some embodiments of the invention.

As discussed above, PSK's may be used according to known protocols. For example, PSK's may be used to derive temporary session keys, for data encryption and decryption, and for other purposes. Further, other than modifications to support multiple PSK's on an AP, these protocols may be implemented as known in the art. FIGS. 6 and 7 illustrate two examples of key exchange mechanisms using PSK's provisioned to an AP according to some embodiments of the invention.

Computer devices increasingly use Wi-Fi® technologies based on the IEEE 802.11 standard. The Wi-Fi® networks may utilize Wi-Fi Protected Access (WPA and WPA2) protocols that use one pre-shared key for authentication and key exchange by an AP at a given time. It should be appreciated that the WPA and WPA2 authentication and key exchange protocols are described here as examples only and any other suitable authentication and key exchange protocols may be employed by the AP and client devices. FIG. 6 is illustrates a key exchange process between an AP and a client device using a Wi-Fi Protected Access2 (WPA2) protocol according to some embodiments of the invention. FIG. 6 shows processes performed on a side of a client device 600, or supplicant, and on a side of an AP 602, or an authenticator. Client device 600 may be, for example, any of the devices shown in FIG. 1. One of skill in the art may note that processing within client 600 in this example is the same as in a key exchange in which an AP supports only one pre-stored key.

The process starts after a client device, which in this example may be referred to as a Wi-Fi client device or a supplicant, sends to AP 602 a request to connect, through the process may be triggered by any suitable event. As discussed above, the process includes generation of a message, a portion of which is based on key stored on the client device. The AP then determines which of the multiple PSK's provisioned to it can be used to authenticate the client device. That PSK may be used for key exchange as described below.

In the WPA2 protocol, the key exchange is performed using Extensible Authentication Protocol over LANs (EAPOL)-KEY messages. At block 604, AP 602 sends Message 1 EAPOL_KEY(ANonce, Unicast) which is received by client device 600 at block 606. A Unicast parameter indicates that Message 1 is sent only to client device 600. ANonce denotes an Authenticator Nonce which, in this example, is a random data of any suitable format generated at AP 602 using WPA2 protocol.

Client 600 receives Message 1 at block 606. For the illustrated key exchange, client device 600 then generates SNonce (Supplicant Nonce), which is also random data of any suitable format.

At block 608, client device 600 calculates a Pairwise Transient Key (PTK) from the ANonce and SNonce using its stored key. Client 600 sends, at block 610, Message 2 EAPOL_KEY(SNonce, Unicast, MIC) using the PTK. A Unicast parameter indicates that Message 2 is sent only to AP 602. A Message Integrity Code (MIC) implemented by the WPA2 protocol is a keyed hashing function that protects data packet integrity by detecting harmful modification of the data packet. The MIC may be, for example, an 8-byte value calculated across the entire non-encrypted raw data packet before being encrypted and transmitted. However, the MIC may be of any suitable format and length as embodiments of the invention are not limited in this respect. Here, MIC is generated using the PTK, which was in turn generated based on a key stored on client 600. Thus, the portion of Message 2 containing the MIC is based on the stored key of client 600. Other devices having a copy of that stored key can likewise generate the same value of MIC. Though, devices without a copy of the client's stored key cannot readily generate the same value for the MIC.

At block 612, AP 602 receives Message 2. At block 614, AP 602 calculates a PTK from the ANonce and SNonce using one of multiple PSK's stored on AP 602. Then, at block 616, the calculated PTK is used to validate the MIC as known in the art. Such validation may be performed by comparing the MIC generated by AP 602 with that received in Message 2. If the pre-stored key used by AP 602 is the same as the key used by client 600, the MIC's should match. At decision block 618, AP 602 (using, for example, a component such as Control Logic 216 shown in FIG. 2) determines whether the MIC received from the client device 600 matches the MIC calculated by AP 602. When it is determined that the MIC does not match the PTK, the process branches to decision block 619, where the process branches based on whether further PSK's remain for comparison. When there are no further PSK's, meaning that there was no match to the key used by client 600, the process branches to block 620 where the key exchange process is aborted and client device 600 is not allowed to access the requested resource and is disconnected from AP 602.

As shown in FIG. 6, operations performed at blocks 614-618 are repeated for each of the multiple PSK's stored at AP 602. Accordingly, if one PSK does not produce a match, the process loops back from block 619 to 614. Thus, the AP determines which of the multiple PSK's, if any, matches a key stored on the client device.

When it is determined that the MIC's match, this indicates that AP 602 has found a PSK matching a key used by the client device 600. Therefore, the connection between the client device 600 and AP 602 is allowed and the client device is allowed to access the resources. In this scenario, the process branches to block 622. Also, the PSK for client device 600 and associated information may be recorded at AP 602. For example, a data structure such as one of data structures 224A-224C shown in FIG. 2 is created and recorded in Connections Store 222.

To complete the key exchange process, the PTK needs to be installed on the client device. Thus, at block 622, AP 602 sends Message 3 EAPOL_KEY(Install PTK, Unicast, MIC, Encrypted GTK) instructing client device 600 install the PTK. The GTK denotes a Groupwise Temporal Key in accordance with the WPA2 protocol that may optionally be created for client device 600. The GTK is generated using the PSK and may be used to identify client device 600 as a member of a group of devices. AP 602 encrypts the GTK and the Encrypted GTK is sent to client device 600 as part of the Message 3. Client device 600 receives Message 3 at block 624 and sends to AP 602, at block 626, an acknowledgment as Message 4 EAPOL_KEY(Unicast, MIC) which is received by AP 602 at block 628. The process may then end.

FIG. 7 is illustrates a key exchange process between an AP and a client device using a Wi-Fi Protected Access (WPA) protocol according to some embodiments of the invention. Like in the WPA2 protocol, the key exchange is performed using Extensible Authentication Protocol over LANs (EAPOL)-KEY messages. FIG. 7 shows processes performed on a client device 700 and on an AP 702. Client device 700 may be, for example, any of the devices shown in FIG. 1. Similarly, AP 702 may be AP 102 shown in FIGS. 1 and 2.

The process may start after a Wi-Fi client device 700, or a supplicant, connects to AP 702 to request access to a network or other resource through AP 702. As discussed above, client device 700 uses its key to generate a part of a message to AP 702 that then determines which if any of the multiple PSK's provisioned to it, can be used to authenticate client device 700. The PSK may be used for key exchange as described below.

At block 704, AP 702 sends Message 1 EAPOL_KEY (ANonce, Unicast) which is received by client device 700 at block 706. A Unicast parameter indicates that Message 1 is sent only to client device 700. ANonce denotes an Authenticator Nonce which, in this example, is a random data of any suitable format generated at AP 702 using WPA protocol. In this example, client device 700 generates SNonce (Supplicant Nonce) which is also random data of any suitable format.

At block 708, client device 700 calculates a Pairwise Transient Key (PTK) from the ANonce and SNonce using its stored key and sends, at block 710, Message 2 EAPOL_KEY (SNonce, Unicast, MIC, SSN IE) which AP 702 receives at block 712. A Unicast parameter indicates that Message 2 is sent only to AP 702. A SSN IE is a Secure Information Element in Message 2 defined according to the WPA protocol The Message Integrity Code (MIC) is defined as described above and includes information generated based on the key stored on client device 700.

At block 714, AP 702 calculates a PTK from the ANonce and SNonce using one of the multiple PSK's provisioned to AP 702. Then, at block 716, the calculated PTK is used to validate the MIC as known in the art. Such validation may be performed by comparing the MIC generated by AP 702 with that received in Message 2. If the pre-stored key used by AP 702 is the same as the key used by client 700, the MIC's should match. Further, at decision block 718, AP 702 (using, for example, a component such as Control Logic 216 shown in FIG. 2) determines whether the MIC received from the client device 700 matches the MIC calculated by AP 702.

When it is determined that the MIC does not match the PTK, the process loops back through block 719 to block 714 where another PSK is tested. If no PSK's match, the process proceeds to where the key exchange process is aborted and client device 700 is not allowed to access the requested resource and is disconnected from AP 702. As shown in FIG. 7, operations performed at blocks 714-718 are repeated until a matching PSK is found or until all of the multiple PSK's stored at AP 702 have been evaluated. Thus, the AP determines which of the multiple PSK's, if any, matches a key stored on the client device.

When it is determined that the MIC generated by AP 702 matches the MIC generated by client 700, the process branches to block 722. At this time, the PSK for client device 700 is recorded at AP 702. For example, a data structure such as one of data structures 224A-224C shown in FIG. 2 is created and recorded in Connections Store 222. At block 722, AP 702 sends Message 3 EAPOL_KEY(Install PTK, Unicast, MIC, SSN IE) that instructs client device 700 to install the PTK. Client device 700 receives Message 3 at block 724, installs the PTK, and sends to AP 702, at block 726, an acknowledgment as Message 4 EAPOL_KEY (Unicast, MIC) indicating that the PTK has been installed. The Message 4 is received by AP 702 at block 728. At this point, the exchange of pairwise temporal keys is completed and client device 700 and AP 702 are mutually authenticated.

The IEEE 802.11 standard supports multicast messages that may be useful, for example, in distribution of video data. The WPA protocol supports groupwise temporal keys generated for multicast messages that are different from pairwise temporal keys such as the PTK.

Thus, the secure connection established between client device 700 and AP 702 can be used by AP 702 to send a message including a Groupwise Temporal Key (GTK) implemented by the WPA protocol generated at AP 702. AP 702 encrypts the GTK and the Encrypted GTK is sent to client device 700 as part of the Message 5 as EAPOL_KEY(Encrypted GTK, GNonce, Group, MIC). GNonce is a Group Nonce which is random data generated for the groupwise temporal key generation, while Group parameter specifies that Message 5 is a multicast message that is sent to a group of devices that client device 700 belongs to. At block 732, client device 700 receives Message 5 and installs the GTK. At block 734, client device 700 sends to AP 702 an acknowledgment Message 6 EAPOL_KEY(Group, MIC) indicating that the Encrypted GTK has been installed on client device 700. This completes the key exchange process between client device 700 and AP 702.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a device configured as an access point, the access point being provisioned with a plurality of pre-shared keys, and the method comprising:
    receiving a request for a connection to the access point from at least one client device, the request comprising a portion generated with a key;
    determining whether the portion comprises information that matches information generated with a key from the plurality of pre-shared keys provisioned to the access point, wherein the plurality of pre-shared keys comprises a plurality of pre-shared keys having different complexities, and wherein a complexity of at least one key from the plurality of pre-shared keys having different complexities depends on a lifetime of the at least one key;
    when it is determined that the information of the portion matches the information generated with the key from the plurality of pre-shared keys, allowing the connection; and
    when it is determined that the information of the portion does not match the information generated with the key from the plurality of pre-shared keys, disallowing the connection.

2. The method of claim 1, wherein the plurality of pre-shared keys having different complexities comprises at least one of a long term pre-shared key and a short term pre-shared key.

3. The method of claim 1, further comprising, in response to a request to remove a selected pre-shared key from the plurality of pre-shared keys:
    removing the selected pre-shared key from the plurality of pre-shared keys;
    determining whether the at least one client device uses the selected pre-shared key; and
    when it is determined that the at least one client device uses the selected pre-shared key, disconnecting the at least one client device.

4. The method of claim 3, wherein the request to remove the selected pre-shared key is performed by a user via a user interface.

5. The method of claim 3, wherein:
    keys of the plurality of pre-shared keys have a time-to-live value associated therewith, and
    the request to remove the selected pre-shared key is generated in response to a determination that a time-to-live value of the selected pre-shared key is expired.

6. The method of claim 1, wherein receiving the request comprises receiving the request in accordance with a WPA protocol or a WPA2 protocol.

7. The method of claim 6, further comprising:
    when the connection is allowed, sending a further message in accordance with the WPA protocol or the WPA2 protocol.

8. The method of claim 1, further comprising, when the at least one client device comprises a plurality of client devices connected to the access point:
    removing a pre-shared key associated with at least one of the plurality of client devices; and
    selectively breaking down the connection to the at least one of the plurality of client devices without disrupting connections to others of the plurality of client devices.

9. The method of claim 8, wherein removing the pre-shared key comprises removing the pre-shared key at least one of when a lifetime of the pre-shared key is expired and when the pre-shared key is removed from the plurality of pre-shared keys.

10. The method of claim 1, further comprising, when it is determined that a pre-shared key associated with the at least one client device matches the key from the plurality of pre-shared keys, generating a group key for the at least one client device.

11. An apparatus configured as an access point, the apparatus comprising:
- an interface configured to receive, in response to user input, a plurality of pre-shared keys having different complexities selected based on user tolerance for provisioning client devices with the plurality of pre-shared keys, wherein the plurality of pre-shared keys comprises at least one pre-shared key of a user-friendly format, and wherein the user-friendly format facilitates entering the at least one pre-shared key by a user;
- computer memory configured to store the plurality of pre-shared keys;
- an interface configured to receive a request for a connection to the access point from at least one client device, the request comprising information generated with a key; and
- control logic configured to:
  - determine whether the information generated with the key matches information generated with a key from the plurality of pre-shared keys;
  - when it is determined that the information generated with the key matches the information generated with the key from the plurality of pre-shared keys, allowing the connection; and
  - when it is determined that the information generated with the key does not match the information generated with the key from the plurality of pre-shared keys, disallowing the connection.

12. The apparatus of claim 11, wherein the computer memory further comprises:
- a plurality of data structures configured to store information on client devices connected to the access point, each data structure from the plurality of data structures storing an identifier of a client device and a pre-shared key used by the client device.

13. The apparatus of claim 11, wherein:
- the information generated with the key comprises a signature of a message comprising the request; and
- determining whether the information generated with the key matches the information generated with the key from the plurality of pre-shared keys comprises computing the signature of the message with information generated with keys from the plurality of pre-shared keys.

14. The apparatus of claim 11, wherein the control logic is configured to, in response to a request to remove a selected pre-shared key from the plurality of pre-shared keys:
- remove the selected pre-shared key from the plurality of pre-shared keys;
- determine whether the at least one client device uses the selected pre-shared key; and
- when it is determined that the at least one client device uses the selected pre-shared key, instruct disconnection of the at least one client device.

15. The apparatus of claim 11, wherein the access point comprises a Wi-Fi enabled device and the at least one client device comprises a Wi-Fi enabled client device.

16. A computer storage device encoded with computer-executable instructions for performing, when executed with at least one processor, a method of operating an access point, the method comprising:
- receiving, via an interface of the access point, a plurality of pre-shared keys having different complexities selected based on security requirements for connections established using the plurality of pre-shared keys, wherein the plurality of pre-shared keys comprises at least one pre-shared key of a user-friendly format used for connections having reduced security requirements;
- receiving a request for a connection to the access point from a client device, the request comprising information generated with a key;
- determining whether the key matches a key from the plurality of pre-shared keys provisioned to the access point;
- when it is determined that the key matches the key from the plurality of pre-shared keys, allowing the connection, the allowing comprising generating one or more keys based on the key from the plurality of pre-shared keys for subsequent communication with the client device; and
- when it is determined that the key does not match the key from the plurality of pre-shared keys, disallowing the connection.

17. The computer storage device of claim 16, comprising provisioning the access point with the plurality of the pre-shared keys comprising receiving a plurality of calls through a programming interface, each call identifying a pre-shared key to be stored in the access point.

18. The computer storage device of claim 17, wherein:
- the computer storage device is further encoded with computer-executable instructions that, when executed, construct a data structure for each allowed connection, the data structure comprising at least one field identifying a pre-shared key of the plurality of pre-shared keys used in forming the connection.

19. The computer storage device of claim 16, wherein receiving the request comprises receiving the request in accordance with a WPA protocol or WPA2 protocol.

20. The computer storage device of claim 16, wherein:
- the plurality of pre-shared keys comprises at least one short-term key having a lifetime associated therewith; and
- the computer storage device is further encoded with computer executable instructions that, when executed, selectively break down the connection at least one of when the lifetime of the at least one short-term key is expired and when the at least one short-term key is removed from the plurality of pre-shared keys.

* * * * *